United States Patent [19]

Caratori et al.

[11] Patent Number: 5,608,408

[45] Date of Patent: Mar. 4, 1997

[54] METHOD OF SOUNDING A CHANNEL

[75] Inventors: Julien Caratori, Savigny sur Orge; Claude Goutelard, Bretigny sur Orge, both of France

[73] Assignee: Societe d'Etudes Thematiques et des Idees 'SET ID', Paris, France

[21] Appl. No.: 553,502

[22] PCT Filed: Mar. 15, 1995

[86] PCT No.: PCT/FR95/00314

§ 371 Date: Feb. 16, 1996

§ 102(e) Date: Feb. 16, 1996

[87] PCT Pub. No.: WO95/27220

PCT Pub. Date: Oct. 12, 1995

[30] Foreign Application Priority Data

Mar. 31, 1994 [FR] France ............................ 94 03808

[51] Int. Cl.$^6$ ....................... G01S 7/292; G01S 7/295
[52] U.S. Cl. ........................ 342/196; 342/22; 342/26
[58] Field of Search .................... 342/196, 159, 342/26, 22, 52

[56] References Cited

U.S. PATENT DOCUMENTS

| | | | |
|---|---|---|---|
| 3,629,813 | 12/1971 | Drenkelfort | 367/115 |
| 4,351,038 | 9/1982 | Alais | 367/105 |
| 4,430,653 | 2/1984 | Coon et al. | 342/22 |
| 4,937,580 | 6/1990 | Wills | 342/22 |
| 5,122,805 | 6/1992 | Peterman et al. | 342/26 |
| 5,357,253 | 10/1994 | Van Etten et al. | 342/22 |
| 5,486,833 | 1/1996 | Barrett | 342/204 |

*Primary Examiner*—John B. Sotomayor
*Attorney, Agent, or Firm*—Lowe, Price, LeBlanc & Becker

[57] ABSTRACT

To reduce emission power, the sounding of a channel comprises a space-of-change transformation of M columns with N initial samples having equal time ranks in the last N impulse responses of a sounding signal received via the channel to produce a transformed matrix, an association with the transformed matrix a matrix of binary elements depending on respective moduli of the samples in the transformed matrix in comparison with a threshold, a spatial filtering of the matrix of binary elements to produce a filtered matrix in which each binary element represents the presence or the absence of the sounding signal in the associated initial sample, and a calculation of an impulse response on the basis only of transformed samples associated with binary elements from the filtered matrix having states representative of the presence of the sounding signal.

12 Claims, 5 Drawing Sheets

FIG. 4A  FIG. 4B  FIG. 4C  FIG. 4D
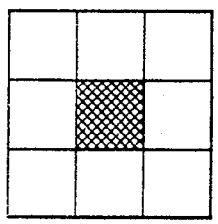
E = 9
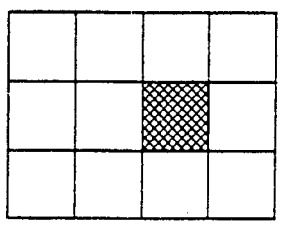
E = 12
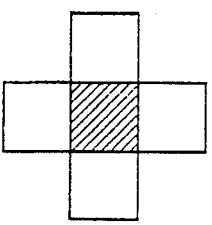
E = 5
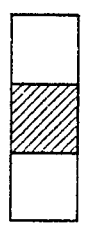
E = 3
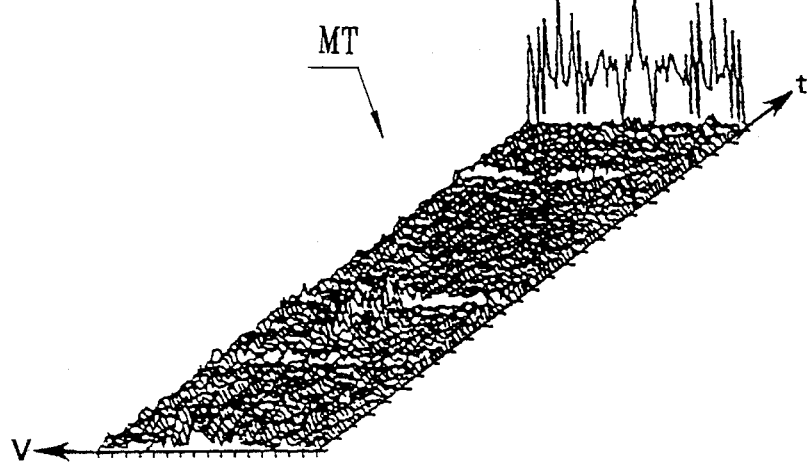
FIG. 5A
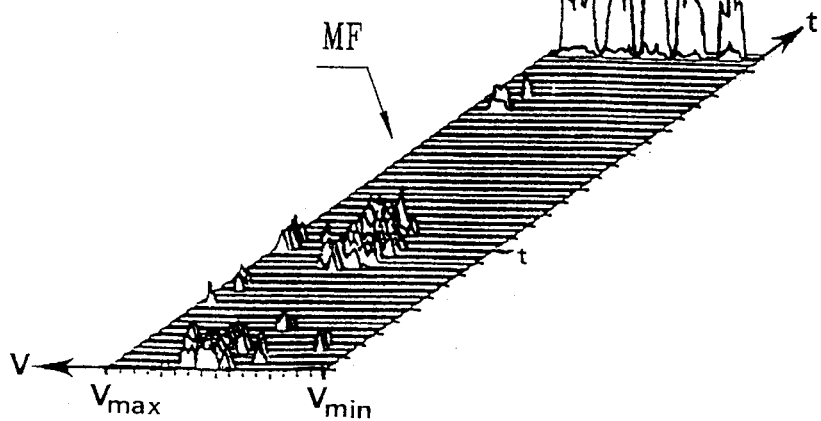
FIG. 5B

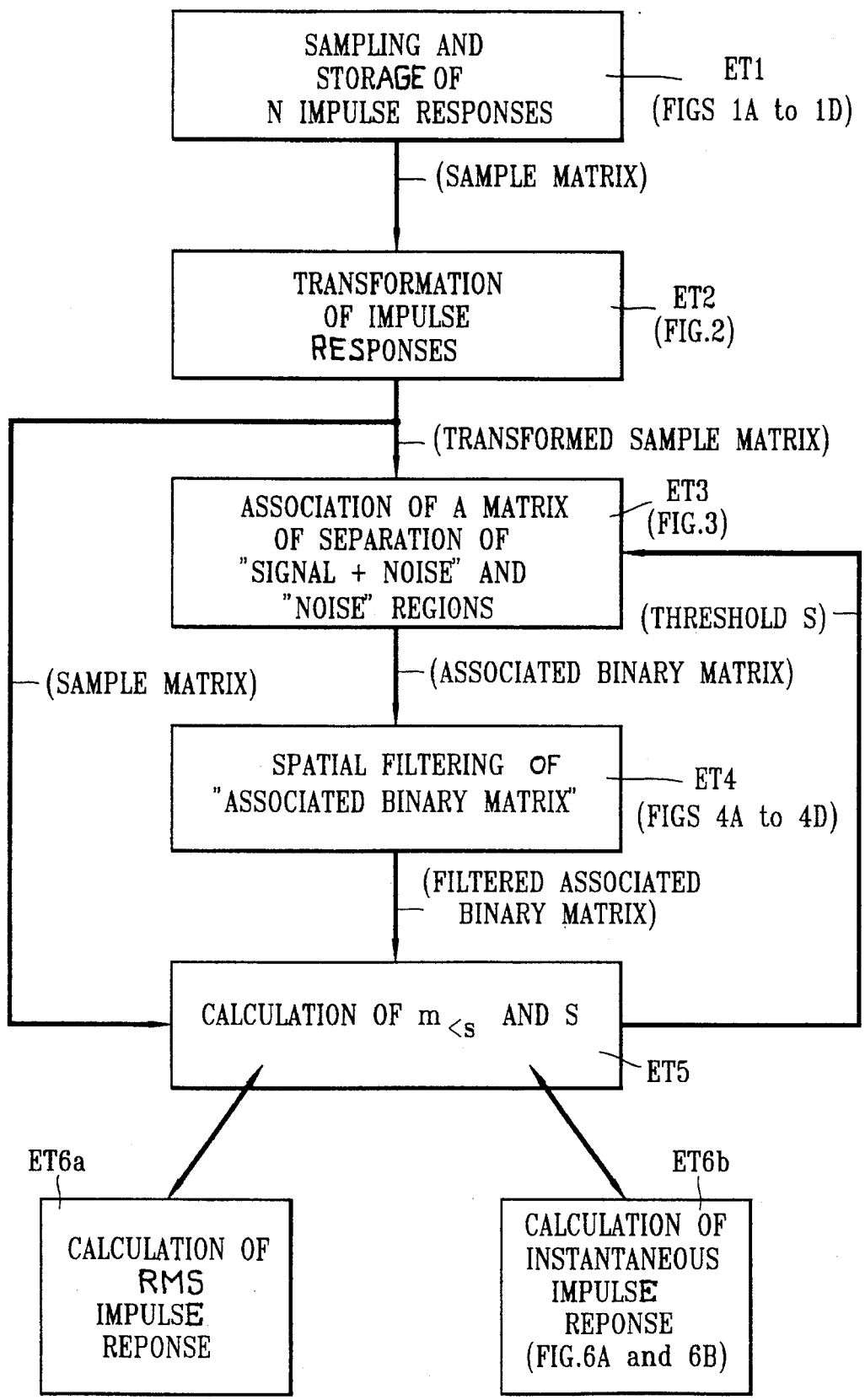

5,608,408

METHOD OF SOUNDING A CHANNEL

BACKGROUND OF THE INVENTION

1. Field of the Invention

The present invention relates to a method of sounding a channel such as a radio channel, or an acoustic channel, in a general manner.

2. Description of the Prior Art

A method of this kind has applications in the ionosphere sounding techniques, for example. Being made up of ionized layers, the ionosphere behaves as a medium of which the dielectric constant varies according to the ionization and the square of the frequency of the received wave leading accordingly to reflection of this received wave.

The person skilled in the art will nevertheless understand that the invention is equally applicable to the sounding of transmission channels on wires, to the detection of targets in radar or sonar applications, or to the radiography of organs in medical applications or of structures in industrial applications.

All the applications mentioned above are based on the emission by an emitter of a signal that is reflected or transmitted in the channel and received as a noise signal added to a sounding signal characterizing the medium in which the emitted signal was propagated, for example indicative of the presence of targets, ionized layers, ... etc. The sounding signal received as a result of reflection or transmission has characteristics correlated to the characteristics of the emitted signal but with a highly attenuated and therefore very low amplitude. The very low amplitude of the sounding signal received as the result of reflection or transmission is not a problem in itself since it is sufficient to amplify the received signal before analyzing it.

However, this attenuation of the sounding signal received as the result of reflection or transmission is always accompanied by background noise of internal or external origin, such as atmospheric noise. This means that errors can arise on analyzing the received signal through confusing a high amplitude noise peak with the sounding signal (false alarm) and conversely through confusing a low amplitude received sounding signal with noise.

All prior art solutions partially solve this problem by calculating the correlation between the emitted signal and the received signal or by filtering the received signal, for example. They all require very high power signal emitters, for example a power in the order of several hundred kilowatts, for a sounding range of 1000 km, and are therefore very costly to implement.

OBJECT OF THE INVENTION

This invention provides a method that remedies the above drawback, as far as the particularly high power of the emitters is concerned. For a predetermined range, an emitter for implementing the invention has a power approximately $10^3$ to $10^6$ times less than that of the prior art emitters.

SUMMARY OF THE INVENTION

Accordingly, a method of sounding a channel by emitting signals and processing noise and sounding signals received from the channel in response to the emitted signals, comprising the following cyclic steps:

emitting a short pulse into the channel separated from a preceding short pulse by a predetermined time interval, receiving and acquiring an impulse response during a time interval equal to the predetermined time interval and succeeding the step of emitting the short pulse, and sampling the impulse response to produce a series of M initial samples which are defined by time ranks and which are stored in an initial sample matrix, is characterized in that it further comprises the steps of:

change-of-space transforming M sample columns each made up of N initial samples that have equal respective time ranks in N latest impulse responses that has been successively acquired and sampled to produce a transformed sample matrix, associating with the transformed sample matrix a binary matrix containing binary elements that are respectively associated with the transformed samples in the transformed sample matrix and that each take one of two binary states depending on the result of comparing a modulus of the transformed associated sample to a threshold, spatial filtering of the binary matrix to produce a filtered binary matrix in which each binary element takes a state representative of the presence or the absence of the sounding signal in the associated initial sample, and calculating a channel impulse response substantially free of noise on the basis only of samples in the transformed sample matrix that are respectively associated with binary elements of the filtered binary matrix having states representative of the presence of the sounding signal.

The spatial filtering step consists in converting each of the binary elements in the binary matrix into a binary element in the filtered binary matrix as a function of binary elements contiguous with said each of the binary elements in the binary matrix.

Preferably, the space-of-change transformation step is obtained by means of a Fourier transform type transformation and in that the step of calculating the channel impulse response consists in inverse Fourier transform type transformation of initial samples of a latest acquired impulse response that are respectively associated with binary elements in the filtered binary matrix having a state representative of the presence of the sounding signal. According to the invention, the so-called "Fourier transform type" transformation means any kown transform of Fourier, Hadamard or Rademacher type, etc.

According to a variant of the invention, the step of calculating the channel impulse response consists in calculating a root mean square impulse response the modulus of which at a given time is equal to the root mean square value of the moduli of N initial samples that are defined by equal sampling time ranks in the N latest impulse responses acquired and sampled, and that are associated with binary elements in the filtered binary matrix having a state representative of the presence of the sounding signal.

The method embodying the invention is preferably adaptive. Accordingly, there is provided a determining step following the spatial filtering step for determining the value of the threshold for a subsequent cyclic associating step conditioned by a given false alarm probability calculated relative to the initial samples that are respectively associated with binary elements in the filtered binary matrix having a state representative of the absence of the sounding signal.

According to a feature of the invention, a method is characterized in that the value of the threshold is determined from a convex function that is derived as a function of the threshold and the samples of the transformed sample matrix associated with the binary elements in the filtered binary matrix having a state representative of the absence of the sounding signal.

BRIEF DESCRIPTION OF THE DRAWINGS

Other features and advantages of the present invention will be apparent from the following description with reference to the corresponding accompanying drawings, in which:

FIGS. 4A through 4D show examples of patterns of contiguous samples for spatial filtering of separated samples;

FIGS. 5A and 5B respectively show a transformed sample matrix and a separated and filtered sample matrix;

FIGS. 7 is an algorithm of the steps of the method of the invention.

DESCRIPTION OF THE PREFERRED EMBODIMENTS

In the following description, the word "channel" is used to describe the medium that is sounded by means of electromagnetic, mechanical or acoustical wave. The nature of the "channel" is not limiting: the channel can be a wire channel or a radio channel in the case of telecommunication applications, or radar or sonar techniques, or an organ in the case of medical applications or a product in the case of industrial applications.

Figure 1:
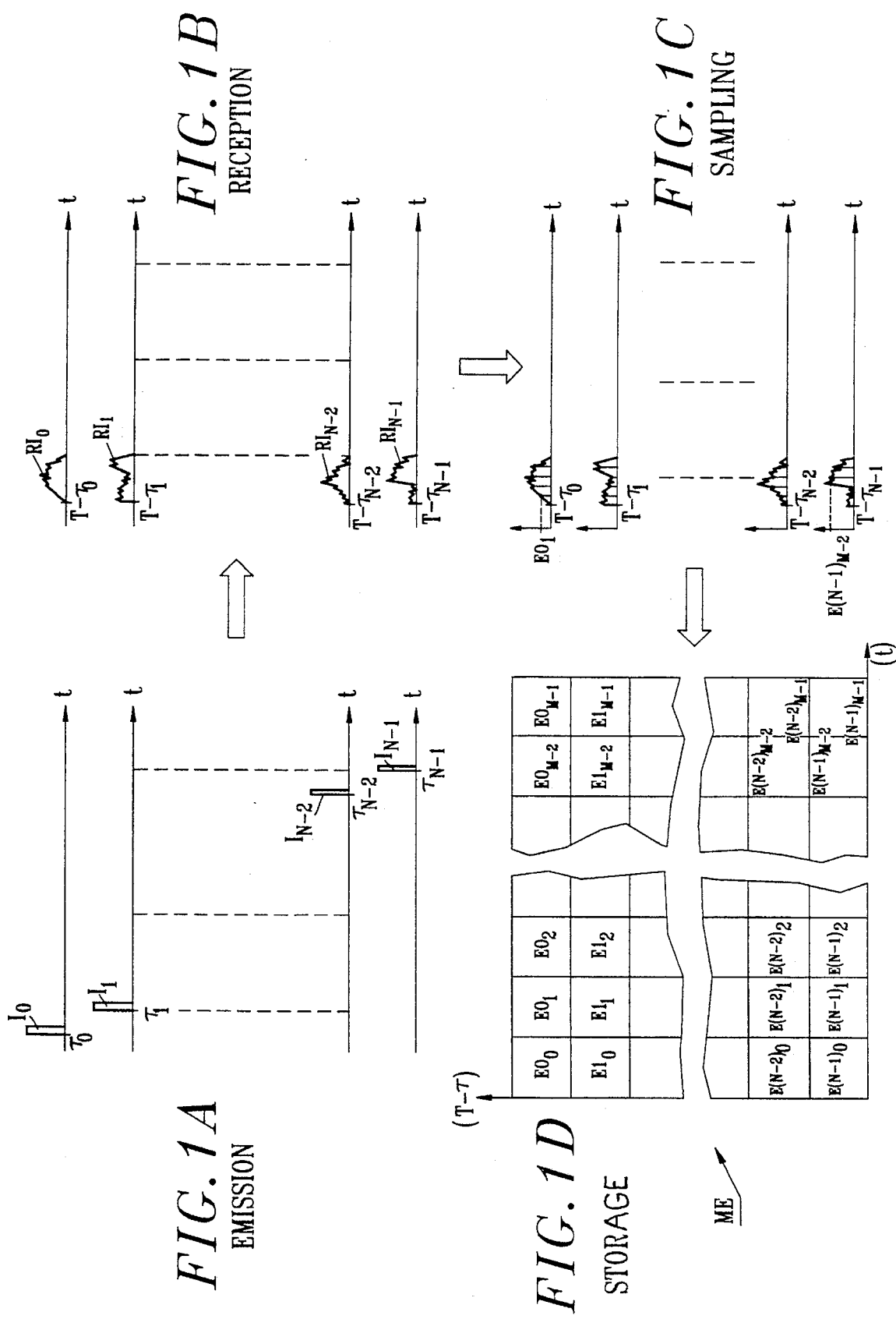
FIGS. 1A, 1B, 1C and 1D are diagrams respectively illustrating steps of emission of successive pulses, reception of impulse responses of a channel sounded to the pulses, sampling of these impulse responses, and storage of initial samples resulting from the sampling, for implementation of the method of the invention.

FIGS. 1A to 1D show diagrammatically the essential steps of obtaining an initial sample matrix ME shown in FIG. 1D in the form of a memory that stores elementary samples produced by sampling impulse responses or received signals over a time t. The initial sample matrix ME is obtained in the following manner.

An emitter produces successive short pulses $I_0$ to $I_{N-1}$ separated by a predetermined time interval. These pulses are produced at respective times $\tau_0$ through $\tau_{N-1}$ and propagate as electromagnetic waves in the channel to be sounded. In practise the time interval between two pulses is a direct function of the maximal sounding distance. In response to these short pulses $I_0$ through $I_{N-1}$ emitted by the emitter, respective signals called channel impulse responses $RI_0$ through $RI_{N-1}$ are received by reflection or transmission in the channel. Each of these impulse responses is taken between the time at which the corresponding emitted pulse is emitted and the time at which the next emitted pulse is emitted, and therefore during the predetermined time interval. Each impulse response $RI_n$, where n is between 0 and the integer (N−1), contains a noise signal possibly mixed with a sounding signal associated with the corresponding emitted pulse $I_n$.

Each of the N impulse responses $RI_0$ through $RI_{N-1}$ is then sampled at a predetermined frequency, as shown in FIG. 1C. The sampling of an impulse response $RI_n$ provides M samples $En_0$ through $En_{M-1}$. As shown in FIG. 1D, the M samples of one impulse response $RI_n$ of the N impulse responses $RI_0$ through $RI_{N-1}$ are stored in M respective contiguous memory locations of an initial sample matrix ME. The respective N sets of samples of the latest N impulse responses $RI_0$ through $RI_{N-1}$ are stored in N rows of memory locations of the initial sample matrix ME, and each of these N rows comprises M memory locations. The content of the matrix ME is interpreted on the following manner: each row is associated with an impulse response in sampled form, and each column corresponds to an amplitude distribution of the samples having the same rank m, with $0 \leq m \leq M$, respectively, in the N impulse responses $RI_0$ through $RI_{N-1}$.

In the above description of production of the initial sample matrix ME only the fixed result of storage in memory of N samples impulse responses is considered. In practise the emission, reception, sampling and storing steps are continuous. This means that an (N+1)th emitted pulse gives rise to an (N+1)th impulse response which is sampled and then written into the Nth row of the initial sample matrix ME. The samples stored in the Nth row are shifted into the (N−1)th row of the matrix. At the same time, the samples contained in the (N−1)th row are themselves shifted into the (N−2)th row, and so on recurrently up to the samples of the 2nd row which are shifted into the 1st row. The samples in the first row are deleted each time a new sampled impulse response is stored in memory. Thus the content of the sampling matrix is modified continuously at the frequency of acquisition of impulse responses. This is consistent with the aim of sounding a channel that does not have time-invariant characteristics.

The word "pulse" as used in the description of the present invention is not restricted to the limited physical concept it denotes in the expression "Dirac pulse". A pulse of this kind may comprise, for example, a coded sequence of "sub-pulses" emitted by the emitter and beneficial in pulse compression techniques. Such pulse compression techniques are intended to reduce the peak power of the emitter and to increase the power gain by spreading the duration of the pulse in time to produce a coded sequence of sub-pulses having an energy equal to that of the pulse. In the receiver are provided correlation means for correlating the received signal with replicas of the time-shifted sequence, and therefore compresses the received signal to produce a signal close to the impulse response that would have been received if a short pulse had been emitted. The effect of the correlation is to resynchronize the phase of the spectrum lines of the sequence received as a result of reflection or transmission in the channel to the phase of the replica coinciding with the received sequence.

By definition, each impulse response written in sampled form in a row of the matrix ME cannot be associated with a random variable since it depends on the characteristics of the sounded channel. On the other hand, each amplitude distribution of the real and imaginary components of the samples of the same rank m stored in a respective column of the matrix ME is a random function of mean value and finite variance defined by the samples having that rank.

As demonstrated below in mathematical terms, any random function can be rendered Gaussian.

In statistics, it is known that a random variable X(t) that is equal to the sum of P non-Gaussian independent random variables $x_1(t)$ through $x_p(t)$, where P is a very large integer, such that:

$$X(t)=x_1(t)+x_2(t)+\ldots+x_p(t)+\ldots+xp(t)$$

is a random variable that obeys the normal law or Gaussian law. This result is known as the central limit theorem. The above definition can be explained as follows: a chance event can be considered as the result of a large number P of independent causes each exerting a slight influence.

Each of these causes is purely random but the event that is the result of these causes can be assessed using a Gaussian law.

If a change of space by transformation, such as a discrete Fourier transformation, is effected on the samples of the matrix ME by the operation:

$$E(v,t) = \sum_{\tau=0}^{N-1} E(\tau,t) \cdot F(\tau,v)$$

where $E(\tau,t)=E\tau_t$ denotes an element of the matrix ME, $E(v,t)$ is an element in the transformed space and $F(\tau,v)$ is a function of a family of orthogonal functions defined by:

$$\sum_{\tau=0}^{N-1} F(\tau,v1)F(\tau,v2) = 0 \quad \forall v1 \neq v2$$

then each sample $E(v,t)$ is a Gaussian random variable.

Referring again to FIG. 1D, as already mentioned, each column corresponds to a respective amplitude distribution of the samples of the same rank for N successive impulse responses $RI_0$ through $RI_{N-1}$. By its very nature, an amplitude distribution for a given column has a random character. By virtue of a change-of-space transformation from $(\tau,t)$ $(v,t)$ of each of the initial amplitude distributions of the samples of the same rank, corresponding to a column of the matrix ME (FIG. 1D), a Gaussian character will be imparted to the amplitude distributions of the signals resulting from transformation of the initial amplitude distributions following the change of space.

Figure 2:
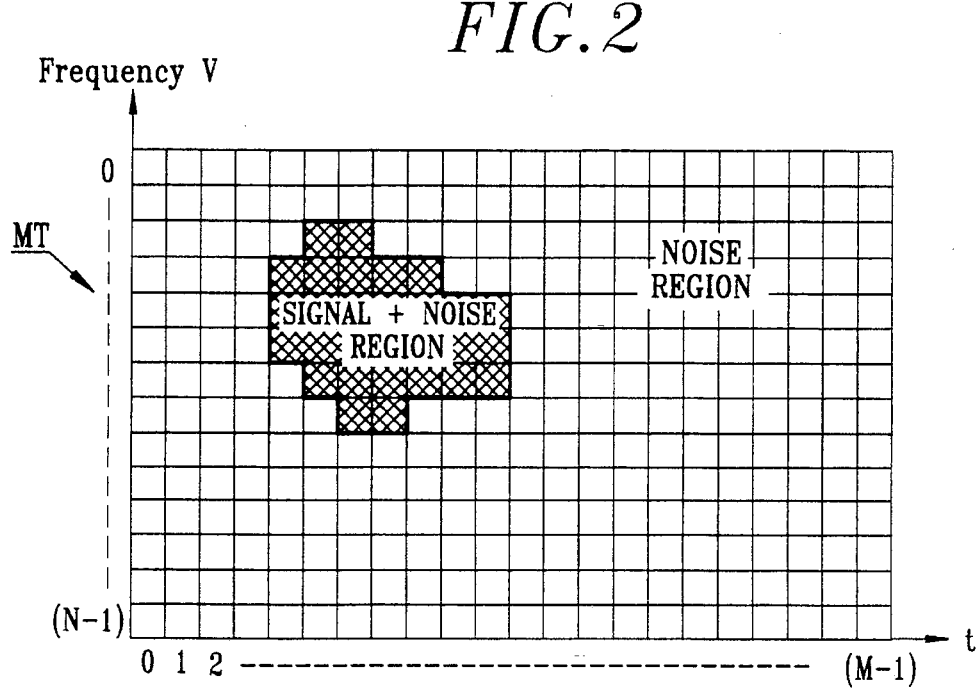
FIG. 2 is a diagram showing in a transformed sample matrix the separation between samples related to noise and samples related to noise added to a sounding signal.

FIG. 2 shows a matrix MT of moduli of transformed samples resulting from a "column" change-of-space transformation of the samples stored in the matrix ME shown in FIG. 1D. It follows from what had been stated above that each column of this matrix MT stores the moduli of the samples whose real and imaginary components have the characteristics of a Gaussian distribution. In practise the change-of-space transformation can be a Fourier transformation, a Hadamard transformation, a Rademacher transformation, etc. The ordinate axis for the memory locations along the columns of the transformed sample matrix MT is the frequency axis which is substituted for the time axis (T−τ) in the matrix ME from FIG. 1D.

Remember that the objective of this change-of-space operation is to make each of the M amplitude distributions of the real and imaginary components of the N samples respectively in the M columns Gaussian. Independently of this change-of-space transformation, each sample of an impulse response in the memory from FIG. 1D either carries or does not carry an echo signal.

Each sample carrying noise, whether mixed with a sounding signal or not, mathematical equations are considered below establishing the presence of a sounding signal in noise.

As previously mentioned, the objective of the change-of-space transformation is to impart a Gaussian character to each of the M amplitude distributions of the real and imaginary components of the N samples in the M columns respectively.

For example, let $z(t)=b(t)+A.\cos(\omega_0 t)$ be the sum of a noise signal $b(t)$ and a sounding signal $A.\cos(\omega_0 t)$, assumed here to be a pure sinusoidal component. For simplicity, $b(t)$ can be written $$b(t)=x(t) \cos \omega_0 t - y(t) \sin \omega_0 t, \text{ that is}$$

$$z(t)=[x(t)+A] \cos \omega_0 t - y(t) \sin \omega_0 t.$$

By setting $x'(t)=x(t)+A$, the variable $MO(t)$ associated with the modulus of a sample is defined such that:

$$MO(t)^2=x'(t)^2+y(t)^2, \text{ that is}$$

$$z(t)=MO(t) \cos (\omega_0 t+\theta),$$

with $\theta=\text{Arctan}(y(t)/x'(t))=\text{Arctan}[y(t)/(x(t)+A)]$.

If $x'(t)$ and $y(t)$ are Gaussian independent variables, we can write:

$$p(x',y)dx'dy = \frac{\exp-[[(x'-A)^2+y^2]]/2\sigma^2}{2\pi\sigma^2} dx'dy, \quad (3)$$

where $\sigma^2$ denotes the variance of the noise signal $b(t)$ and $p(x',y)$ is the probability density for the pair $(x',y)$.

Changing to polar coordinates, with $x'=MO \cos\theta'$ and $y=MO \sin \theta'$, equation (3) is written:

$$p(MO) = \int_0^{2\pi} \frac{MO}{\sigma^2} \cdot e^{(-1/2\sigma^2)\cdot(MO^2+A^2-2A\cdot MO\cdot\cos\theta')}d\theta',$$

or $$p(MO) = \frac{MO}{\sigma^2} e^{-(MO^2+A^2)/2\sigma^2} \cdot (1/2\pi) \int_O^{2\pi} e^{A\cdot MO\cos\theta'/\sigma^2}d\theta',$$

that is:

$$p(MO) = \frac{MO}{\sigma^2} e^{-(MO^2+A^2)/2\sigma^2} \cdot I_0\left(\frac{MO \cdot A}{\sigma^2}\right) \quad (4)$$

where $I_0$ denotes the 0 order modified Bessel function of the first kind.

The above mathematical results establish that in the presence of a received sounding signal in a sample from the transformed sample matrix MT, the probability density of the modulus MO of that sample is given by equation (4).

Equation (4) further means that in the absence of a received sounding signal in a sample from the matrix MT a probability density of the modulus of that sample is described by Rayleigh's law, as given by the equation:

$$P(MO) = MO/\sigma^2 \exp\left(-\frac{M^2}{2\sigma^2}\right) \quad (5)$$

The principle of detection by sounding used in the invention is to effect a comparison sample by sample in the transformed sample matrix MT of FIG. 2 between the modulus of the sample and a threshold S which discriminates presence and absence of a sounding signal in that sample, the presence and absence being respectively defined in terms of the probability density of the modulus of the sample by equations (4) and (5).

As shown in FIG. 2, the samples in the transformed sample matrix MT, which are obtained by a change-of-space transformation of a series of impulse responses $RI_0$ through $RI_{N-1}$, can be separated into first samples containing a sounding signal and second samples the modulus of which does not contain any sounding signal component. These first and second samples are grouped in SIGNAL+NOISE and NOISE "regions" in FIG. 2.

The NOISE region, containing only noise samples, is characterized by a probability density defined by equation (5). In this NOISE region, the probability $P_{MO_a}$ that a sample has a modulus MO lying between $MO_a$ and $(MO_a + \Delta MO_a)$ is equal to:

$$P_{MO_a} = \int_{MO_a}^{MO_a + \Delta MO_a} (MO/\sigma^2) \cdot \exp\left(-\frac{MO^2}{2\sigma^2}\right) \cdot dMO.$$

The samples in the NOISE region are distinguished from the samples in the SIGNAL+NOISE region by comparing the modulus of each sample and a modulus threshold S. If the modulus of the sample is less than the threshold S, then the sample is in the NOISE region. On the other hand, if the modulus of the sample is more than the threshold S, the sample is in the SIGNAL+NOISE region. For a predetermined threshold S, the NOISE region is defined by a false alarm probability $P_{fa}$ equal to the probability that the modulus of the samples in the NOISE region lies between S and $+\infty$.

Thus, we obtain from equation (5):

$$\begin{aligned} P_{fa} &= \int_{S}^{+\infty} (MO/\sigma^2) \cdot \exp\left(\frac{-MO^2}{2\sigma^2}\right) \cdot dMO \\ &= \exp(-S^2/2\sigma^2) \end{aligned}$$

In this NOISE region, the mean $m_{<S}$ of the moduli of the samples which have a modulus less than the threshold S is written:

$$m_{<S} = \frac{\int_{0}^{S} MO^2 \cdot \exp\left(\frac{-MO^2}{2\sigma^2}\right) dMO}{\int_{0}^{S} MO \cdot \exp\left(\frac{-MO^2}{2\sigma^2}\right) dMO} \quad (6)$$

Figure 3:
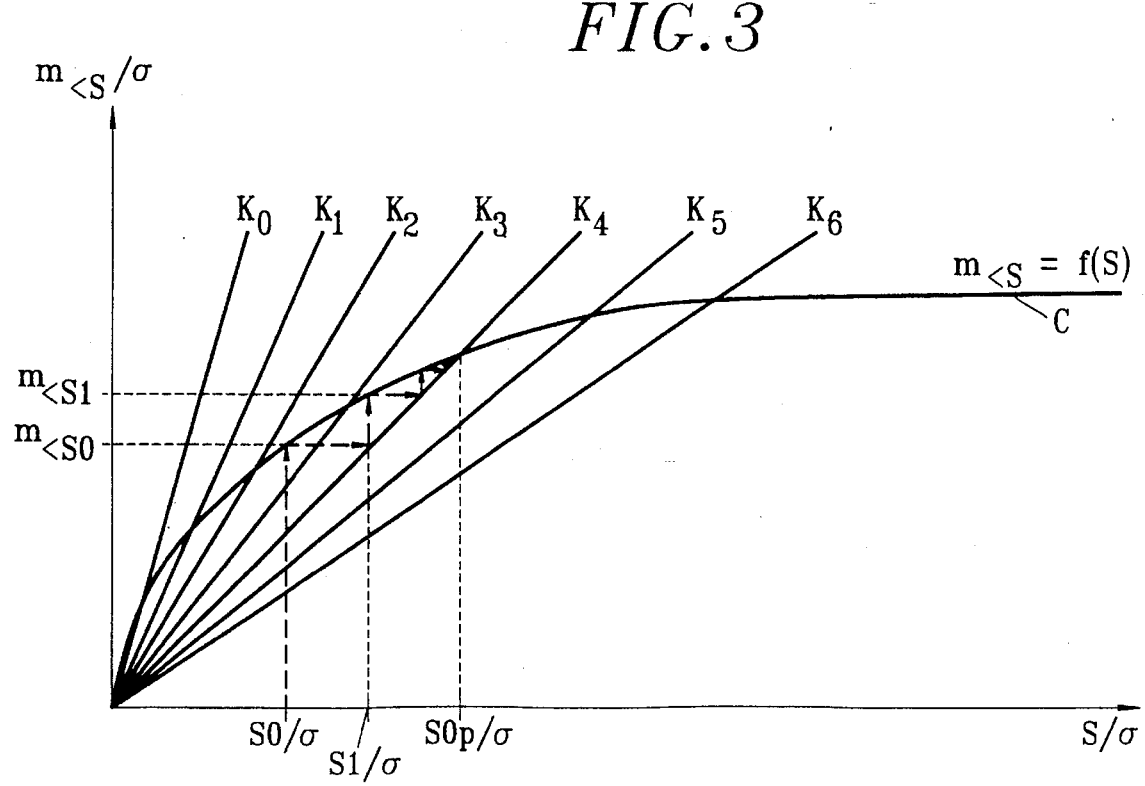
FIG. 3 is a diagram showing the modulus mean as a function of modulus threshold used to separate the samples relating to noise from the samples related to noise added to a sounding signal in the transformed sample matrix.

FIG. 3 shows the convex function C of the mean $m_{<S}$ as a function of the threshold S in accordance with equation (6). A group of straight lines defined by $(m_{<S} = K_i \cdot S)$ is also shown in FIG. 3, where $K_i$ takes predetermined discrete values.

Each of the director coefficients $K_i$ of the straight line segments of the group is representative of a false alarm probability $P_{fa}$. In the straight line equation $(m_{<S} = K_i \cdot S)$, the coefficient $K_i$ represents the ratio between the mean $m_{<S}$ of the amplitudes of the samples having an amplitude less than the threshold S and the threshold S. If the mean $m_{<S}$ is very much below the threshold S, this means that there is a very low false alarm probability $P_{fa}$ for the samples concerned. The closer the mean $m_{<S}$ to the threshold S, the greater the false alarm probability $P_{fa}$. Thus the coefficient $K_i$ of a straight line of the group is directly linked to the false alarm probability.

FIG. 3 assists with graphical determination of an optimal threshold denoted SOp. The mean $m_{<S}$ for a predetermined threshold S is calculated beforehand from a given group of samples from the transformed sample matrix MT. If a false alarm probability $P_{fa}$ is fixed beforehand which, as already made clear, is directly linked to a straight line director coefficient value $(m_{<S} = K_i \cdot S)$, this coefficient value $K_i$ is used to determine "graphically" the optimal value of the threshold S, denoted SOp. Indeed, it is sufficient to choose initially a very low minimal threshold S=S0. A corresponding mean $m_{<S0}$ is calculated for this minimal threshold S0 using equation (6). This mean leads to the determination of a threshold S=S1 from the straight line equation associated with the fixed false alarm probability $P_{fa}$, and this straight line corresponds to $K_i = K_4$ in the example shown in FIG. 3. This threshold S1 then determines the corresponding value of the mean $m_{<S1}$ calculated for the given group of samples. As shown by the dashed straight line segments in a staircase configuration in FIG. 3, the optimal threshold SOp is then determined by a recurrent method for a given false alarm probability $P_fa$ associated with a straight line having director coefficient $K_i$. This graphical method of determining an optimal threshold S=SOp as a function of a given false alarm probability $P_{fa}$ is optimal in terms of the calculation means required.

The graphical method just described which fixes the optimal threshold SOp as a function of the mean $m_{<S}$ of the moduli of the samples having a modulus more than a threshold is just one of the methods that can be used. The invention encompasses all methods defining a curve f(S) derived from samples from the transformed sample matrix MT and from the threshold S and which is a convex curve such that the adaptive calculation of the optimal threshold SOp converges.

By virtue of the calculated optimal threshold SOp, the NOISE region and the SIGNAL+NOISE region in the transformed sample matrix MT are separated by comparing the modulus of each sample of the matrix MT with the threshold SOp. In practise this region separation is effected by associating the transformed sample matrix MT with a binary matrix having the same size. Each of the binary elements in the binary matrix is associated with respective one of the samples in the transformed sample matrix MT, and takes the state "1" if the associated sample in the matrix MT has a modulus more than the threshold SOp, and the state "0" if the associated sample in the matrix MT has a modulus less than the threshold SOp.

The separation of the NOISE and SIGNAL+NOISE regions in the associated binary element matrix is only accomplished to within a false alarm probability factor. This means that there are binary elements at state "0" in the associated binary matrix, which are therefore associated with samples in the matrix MT which are deemed to be noise samples, although they in fact correspond to samples of the sounding signal added to noise, and conversely binary elements at state "1" which are associated with samples that are deemed to be signal samples, although they in fact correspond to noise samples.

To solve this problem, the invention applies spatial filtering of the binary elements of the associated matrix to produce a filtered associated binary matrix. For this purpose, consider a group of E contiguous binary elements in the associated binary matrix. For example, FIGS. 4A to 4D respectively show a group of E=3×3 binary elements circumscribed by a square, a group of E=3×4 binary elements circumscribed by a rectangle, a group of E=5 binary elements in a cruciform configuration, and a group of E=3 binary elements taken from a row or column in the associated binary matrix.

If the group of E binary elements is associated with E samples in the transformed sample matrix MT which belongs to the NOISE region, the probability $P_B(F)$ that a number F of binary elements, with $F \leq E$, from these E binary elements in the associated binary matrix have a state equal to "1" or, which amounts to the same thing, that a number F of samples from the E associated samples have a modulus more than the threshold S is written:

$$P_B(F) = C_E^F \cdot P_{fa}^F \cdot (1 - P_{fa})^{E-F} \qquad (7)$$

where $$C_E^F = \frac{E!}{F!(E-F)!}$$

denotes the number of combinations of F binary elements from the E binary elements of the group.

Similarly, if this group of E binary elements is associated with a group of E samples which belong to the SIGNAL+NOISE region, the probability $P_S(F)$ that a number F of samples, with F≤E, from the E samples have a modulus more than the threshold S is written:

$$P_S(F) = \sum_{i=0}^{F} C_p^i Pd^i (1-Pd)^{p-i} C_{E-p}^{F-i} Pfa^{F-i} (1-Pfa)^{E-F+i} \qquad (8)$$

where Pd denotes a detection probability, $C_p^i$ denotes the number of combinations of i samples from p samples, and $C_{E-p}^{F-i}$ denotes the number of combinations of (F-i) samples from (E-p) samples. Equation (8) results from the fact that in the SIGNAL+NOISE region a given sample may comprise only noise or may comprise signal and noise. If (E-p) denotes the number of samples of the group comprising only noise, the probability that F samples from E samples have a modulus more than the threshold S results from the probability ($_{C_p}{}^i Pd^i (1-Pd)^{p-i}$) that i samples from the p samples of the E samples comprising signal and noise have a modulus more than the threshold S, AND the probability ($_{C\ E-p}{}^{F-i} Pfa^{F-i}(1-Pfa)^{E-F+1}$) that (F-i) samples from the (E-p) samples comprising only noise have a modulus more than the threshold S.

The above equations (7) and (8) give the probabilities $P_S(F)$ and $P_B(F)$ that a number F of samples from E contiguous samples of a group have a modulus more than the threshold S, respectively in the NOISE region and in the SIGNAL+NOISE region. These equations allow an appropriate choice of the values E and F, for example E=9 and F=3, to give a low value to $P_B(F)$ and a high value to $P_S(F)$.

The invention therefore proposes to apply spatial filtering to the associated binary matrix to produce a filtered associated binary matrix in two steps:

(a) for each group of E binary elements, as shown shaded in FIGS. 4A to 4D, centered on a respective central binary element of the associated binary matrix, the sample associated with said central binary element is considered to comprise signal and noise if and only if said central binary element has a state equal to "0" and if, in the group of binary elements, at least F binary elements have a state equal to "1". This spatial filtering step is consistent with the very low value taken by the probability $P_B(F)$ in the NOISE region; and (b) for each binary element group with E binary elements centered on a respective central binary element of the associated binary matrix, the sample associated with said central binary element is considered to comprise signal and noise if and only if said central binary element has a state equal to "1" and if, in said group, at least (F-1) binary elements have a state equal to "1". This spatial filtering step is consistent with the relatively high value taken by probability $P_S(F)$ in the SIGNAL+NOISE region.

After these filtering steps (a) and (b), a spatially filtered associated binary matrix is derived from the associated binary matrix in which the states of the binary elements take the value "1" if the associated respective samples are deemed to comprise signal by these spatial filtering steps, and the value "0" if the associated respective samples are deemed to comprise only noise by the steps (a) and (b).

FIGS. 5A and 5B respectively show a transformed sample matrix MT resulting from change-of-space transformation of the initial sample matrix ME and, in corresponding relationship with the latter matrix, a filtered sample matrix MF resulting from the "suppression" of all the samples in the matrix MT respectively associated with binary elements at state "0" in the filtered associated binary matrix. In this latter matrix MF, the only samples retained are the samples from the SIGNAL+NOISE region, the moduli of the NOISE samples having been set to 0.

The filtered sample matrix MF is used to deduce the impulse response of the sounded channel, representative of targets, ionized layers, etc, depending on the nature of the channel. To be more precise, a root mean square (rms) impulse response and/or an instantaneous impulse response are deduced.

Referring to FIG. 5B, the amplitude of an rms impulse response at a time t associated with a sampling rank m, where m lies between 0 and (M−1), is equal to the rms value of the moduli of the N initial samples in the filtered sample matrix MF between frequency limits vmin and vmax for a Fourier transform type transformation, said N samples having equal sampling ranks, i.e. coinciding with an equal time shift relative to the times at which the corresponding pulses are emitted.

Let H(t) be the rms impulse response, its value at a discrete time $t_i$ being written:

$$H(t_i) = \left[ \sum_{V=Vmin}^{Vmax} MO^2(t_i, v) \right]^{1/2} / N$$

$MO(t_i, v)$ denoting the modulus of a sample at coordinates $(t_i, v)$ in the filtered sample matrix.

Referring to FIG. 1D, the instantaneous impulse response is obtained in the following manner. Each latest impulse response $RI_{N-1}$ acquired is sampled and then the samples $E(N-1)_0$ through $E(N-1)_{M-1}$ are stored in memory. These samples are processed in the change-of-space transformation and spatial filtering steps embodying the invention by modifying the initial sample matrix ME to yield the filtered sample matrix MF, and by using associated and filtered associated intermediate binary matrices.

In this embodiment of the invention, the change-of-space transformation is the "column" Fourier transform of the samples. The instantaneous impulse response is then the result of the inverse Fourier transform of the samples $E(N-1)_0$ through $E(N-1)_{M-1}$ in the filtered sample matrix MF after their change-of-space transformation and spatial filtering. All of the noise is in this way expunged from the filtered samples and therefore does not degrade the instantaneous impulse response.

Figure 6A:
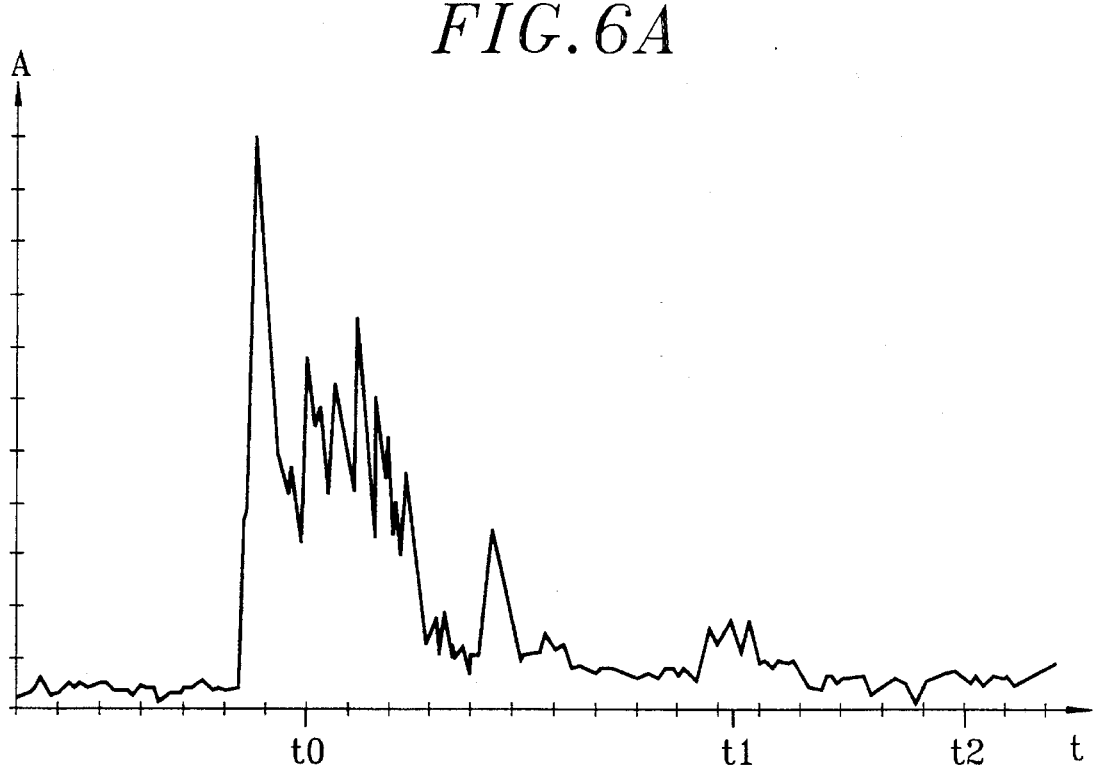
FIGS. 6A and 6B are diagrams respectively showing impulse responses calculated on the basis of initial samples and separated and filtered samples in accordance with the invention.
Figure 6B:
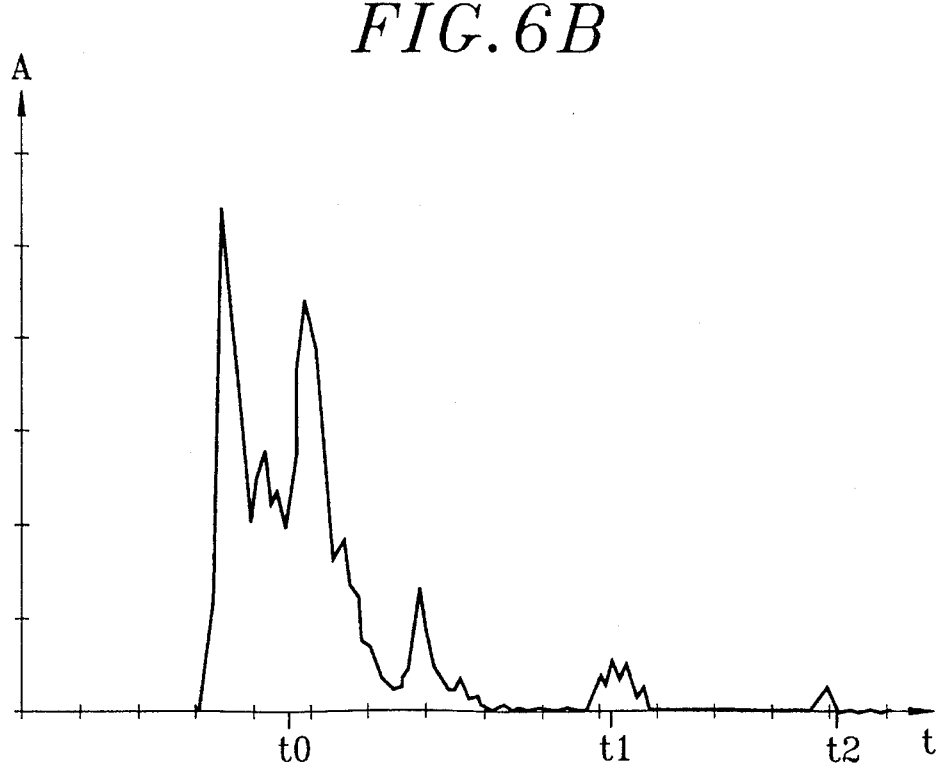

By way of example, FIGS. 6A and 6B show two rms impulse responses respectively obtained from initial samples in the initial sample matrix ME and from corresponding samples in the filtered sample matrix MF resulting from change-of-space transformation and spatial filtering of the matrix ME in accordance with the invention. It will be noticed that three targets are detected at times $t_0$, $t_1$ and $t_2$.

Without the processings in accordance with the invention, the impulse response (FIG. 6A) is mixed with noise which leads to confusion in the detection of the target at $t_2$.

FIG. 7 summarizes the essential steps ET1 to ET6 of implementation of the method in accordance with the invention. Step ET1 relates to the emission of successive pulses $I_0, I_1, \ldots I_{N-1}$, the reception and acquisition of the respective impulse responses $RI_0, RI_1, \ldots RI_{N-1}$ returned by the sounded channel in response to those pulses, the sampling and the storage in memory of these impulse responses as shown in FIGS. 1A to 1D. In the second step ET2, the sampled impulse responses transcribed into the initial sample matrix ME are subjected to a change-of-space transformation. This transformation is applied to the initial samples, ordered in respective "columns", of the impulse responses $RI_0$ through $RI_{N-1}$ resulting from sampling at times having the same time offset relative to the corresponding emitted pulses, i.e. to the M columns of N samples having the same rank. As already made clear, this transformation has the property of conferring a Gaussian character on each distribution of the real and imaginary components of samples having the same rank.

This transformed sample matrix MT obtained in this way by change-of-space transformation is associated with a binary matrix in which the binary elements are respectively associated with samples of the matrix MT and take the state "1" for associated respective samples the modulus of which is more than a threshold S and the state "0" for associated respective samples the modulus of which is less than this threshold S (step ET3).

For a finer distinction between samples comprising only noise and samples comprising noise mixed with the sounding signal, the next step is to apply spatial filtering to the binary elements of the associated binary matrix, already commented on with reference to FIGS. 4A to 4D. This spatial filtering produces a filtered associated binary matrix which redefines the characteristic of each sample in the sampling matrix ME, as to whether it comprises signal or not.

A new threshold can therefore be defined as a function of the mean $m_{<S}$ of the samples recognized as comprising only noise in the filtered associated binary matrix (step ET5). The filtered associated matrix is also used to deduce the rms and instantaneous impulse responses for each acquisition, sampling and storage in memory of a new impulse response, as described previously.

As shown by the arrow linking the two boxes relating to the step ET5 to the box relating to step ET3, the method of the invention is an adaptive method. Its adaptive nature is inherent in the threshold S used to define an associated binary matrix relative to a first separation of samples according to whether they comprise noise or not. The threshold S is deduced from the filtered associated binary matrix, to be more precise from the mean $m_{<S}$ of the moduli of samples deemed to comprise only noise, and therefore associated with binary elements at state "0" in the filtered associated binary matrix. This threshold S significant of the adaptive character of the method is modified for each new acquisition of a new impulse response and thus modification of a "row" in the sample matrix.

As stated in the preamble to the description, one of the main objects of the invention is to reduce considerably the power required to sound a channel. The invention has the advantage of carrying out a plurality of soundings simultaneously at different emission frequencies without requiring a very high power of the emitter, given the low power required for each sounding in accordance with the invention. This simultaneity of soundings is not conceivable using the prior art since the power needed for each sounding is high. The implementation of the method in variable frequency sounding systems, known as "flash" sounding systems, enables a reduction in the sounding time by a factor Q equal to the number Q of simultaneous soundings at respective different frequencies, said number Q being limited by the available power of the emitter.

What we claim is:

1. A method of sounding a channel by emitting signals and processing noise and sounding signals received from said channel in response to said emitted signals, comprising the following cyclic steps:

emitting a short pulse ($I_1 \ldots, I_{N-1}$) into said channel separated from a preceding short pulse ($I_0, \ldots I_{N-2}$) by a predetermined time interval ($\tau_1 - \tau_0, \ldots, \tau_{n-1} - \tau_{n-2}$), receiving and acquiring an impulse response ($RI_1, \ldots RI_{N-1}$) during a time interval equal to said predetermined time interval and succeeding said step of emitting said short pulse ($I_0, \ldots I_{N-1}$), and sampling said impulse response ($RI_0, \ldots RI_{N-1}$) to produce a series of M initial samples ($EO_0$ to $EO_{M-1}$, $\ldots E(N-1)_0$ to $E(N-1)_{M-1}$) which are defined by time ranks (0 to (M-1)), and which are stored in an initial sample matrix, characterized in that it further comprises the steps of:

change-of-space transforming M sample columns each made up of N initial samples ($EO_0$ to $E(N-1)_0, \ldots EO_{M-1}$ to $E(N-1)_{M-1}$) that have equal respective time ranks in N latest impulse responses that have been successively acquired and sampled to produce a transformed sample matrix, associating with said transformed sample matrix a binary matrix containing binary elements that are respectively associated with the transformed samples in said transformed sample matrix, and that each take one of two binary states depending on the result of comparing a modulus of said transformed associated sample to a threshold, spatial filtering of said binary matrix to produce a filtered binary matrix in which each binary element takes a state representative of the presence or the absence of the sounding signal in the associated initial sample, and calculating a channel impulse response substantially free of noise on the basis only of samples in the transformed sample matrix that are respectively associated with binary elements of the filtered binary matrix having states that are representative of the presence of the sounding signal.

2. The method claimed in claim 1, characterized in that said spatial filtering step consists in converting each of the binary elements in said binary matrix into a binary element in said filtered binary matrix as a function of binary elements contiguous with said each of the binary elements in the binary matrix.

3. The method claimed in claim 2, characterized in that said space-of-change transforming step is obtained by means of a Fourier transform type transformation and in that the step of calculating said channel impulse response consists in inverse Fourier transform type transformation of initial samples of a latest acquired impulse response that are respectively associated with binary elements in the filtered binary matrix having a state representative of the presence of the sounding signal.

4. The method claimed in claim 2, characterized in that the step of calculating said channel impulse response consists in calculating a root mean square impulse response the modulus of which at a given time ($t_i$) is equal to the root mean square value of the moduli (MO) of N initial samples that are defined by equal sampling time ranks (0 to M) in said N latest impulse responses acquired and sampled, and that are associated with binary elements in the filtered binary matrix having a state representative of the presence of the sounding signal.

5. A method as claimed in claim 2, characterized by a determining step following said spatial filtering step for determining the value of said threshold for a subsequent cyclic associating step conditioned by a given false alarm probability calculated relative to the initial samples that are respectively associated with binary elements in the filtered binary matrix having a state representative of the absence of the sounding signal.

6. The method claimed in claim 1, characterized in that said space-of-change transforming step is obtained by means of a Fourier transform type transformation and in that the step of calculating said channel impulse response consists in inverse Fourier transform type transformation of initial samples of a latest acquired impulse response that are respectively associated with binary elements in the filtered binary matrix having a state representative of the presence of the sounding signal.

7. A method as claimed in claim 6, characterized by a determining step following said spatial filtering step for determining the value of said threshold for a subsequent cyclic associating step conditioned by a given false alarm probability calculated relative to the initial samples that are respectively associated with binary elements in the filtered binary matrix having a state representative of the absence of the sounding signal.

8. The method claimed in claim 1, characterized in that the step of calculating said channel impulse response consists in calculating a root mean square impulse response the modulus of which at a given time ($t_i$) is equal to the root mean square value of the moduli (MO) of N initial samples that are defined by equal sampling time ranks (0 to M) in said N latest impulse responses acquired and sampled, and that are associated with binary elements in the filtered binary matrix having a state representative of the presence of the sounding signal.

9. A method as claimed in claim 8, characterized by a determining step following said spatial filtering step for determining the value of said threshold for a subsequent cyclic associating step conditioned by a given false alarm probability calculated relative to the initial samples that are respectively associated with binary elements in the filtered binary matrix having a state representative of the absence of the sounding signal.

10. A method as claimed in claim 1, characterized by a determining step following said spatial filtering step for determining the value of said threshold for a subsequent cyclic associating step conditioned by a given false alarm probability calculated relative to the initial samples that are respectively associated with binary elements in the filtered binary matrix having a state representative of the absence of the sounding signal.

11. The method claimed in claim 10, characterized in that the value of the threshold is determined from a convex function that is derived as a function of said threshold and said samples of the transformed sample matrix associated with said binary elements in the filtered binary matrix having a state representative of the absence of the sounding signal.

12. The method of claim 1 wherein the sounding method is performed simultaneously for a plurality of different soundings, different short pulses for the different soundings having different emission frequencies.

* * * * *